(12) United States Patent
Clark

(10) Patent No.: US 11,306,757 B2
(45) Date of Patent: Apr. 19, 2022

(54) SWING ARM FOR RECESSED LIGHTING FIXTURES

(71) Applicant: ABL IP Holding LLC, Atlanta, GA (US)

(72) Inventor: Stephen Clark, Downers Grove, IL (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 17/026,450

(22) Filed: Sep. 21, 2020

(65) Prior Publication Data
US 2021/0088066 A1 Mar. 25, 2021

Related U.S. Application Data

(60) Provisional application No. 62/902,620, filed on Sep. 19, 2019.

(51) Int. Cl.
*F16B 13/04* (2006.01)
*F21V 21/04* (2006.01)
*F21S 8/02* (2006.01)
*F21V 29/77* (2015.01)

(52) U.S. Cl.
CPC .............. *F16B 13/04* (2013.01); *F21S 8/026* (2013.01); *F21V 21/047* (2013.01); *F21V 29/773* (2015.01)

(58) Field of Classification Search
CPC ...... F21V 21/047; F21V 29/773; F21S 8/026; F16B 13/04
See application file for complete search history.

(56) References Cited

U.S. PATENT DOCUMENTS

| 5,964,523 | A | 10/1999 | Eversberg | |
|---|---|---|---|---|
| 9,116,418 | B2* | 8/2015 | Mohan | G03B 17/561 |
| 10,408,436 | B2* | 9/2019 | Wronski | F21V 21/047 |
| 10,900,644 | B1* | 1/2021 | Steines | F21V 19/0055 |
| 2015/0103536 | A1* | 4/2015 | Wronski | F21S 8/02 362/365 |
| 2017/0045209 | A1* | 2/2017 | Schubert | F21V 21/14 |
| 2018/0058629 | A1* | 3/2018 | Hart | E04B 9/006 |

FOREIGN PATENT DOCUMENTS

DE 102012208846 11/2013

* cited by examiner

*Primary Examiner* — Leah Simone Macchiarolo
(74) *Attorney, Agent, or Firm* — Kilpatrick Townsend & Stockton LLP

(57) ABSTRACT

A recessed lighting fixture includes an elongated body including a flange and a pair of swing arms. The swing arms are deployable between a stowed configuration adjacent to the elongated body, to a deployed configuration wherein the swing arms extend radially from the elongated body. In the deployed configuration the swing arms are translatable along threaded members extending along the elongated body in order to clamp a ceiling or other surface between the swing arms and the flange to secure the recessed lighting fixture into a hole in the ceiling. The swing arms comprise removable portions that can be used to increase the range of thicknesses of surface in which the recessed lighting fixture can be installed.

18 Claims, 7 Drawing Sheets

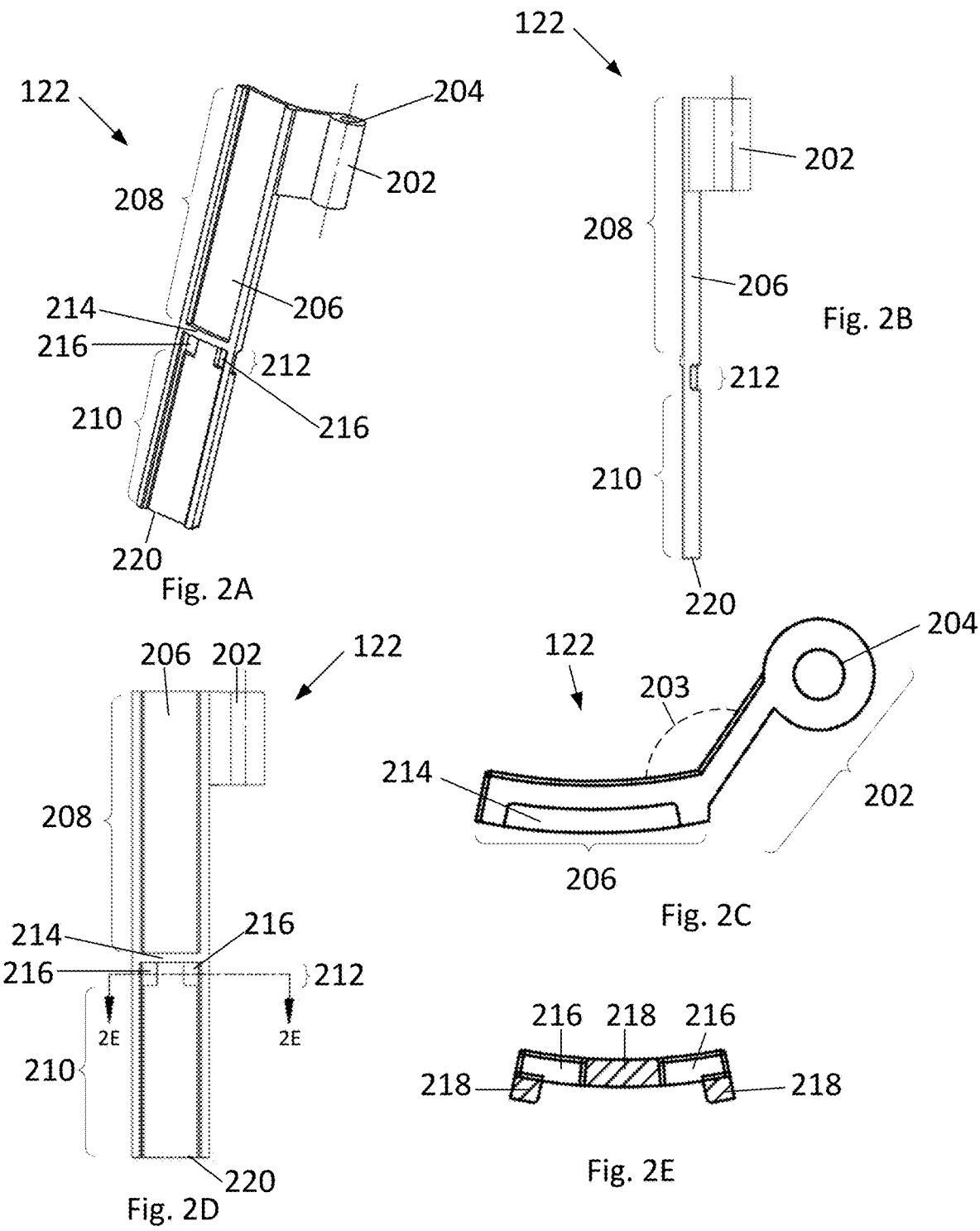

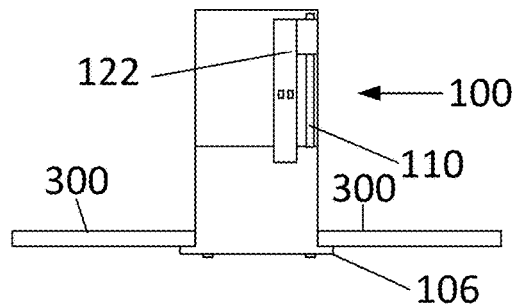
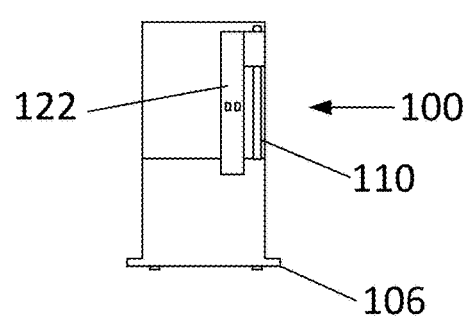
Fig. 3A
Fig. 3B
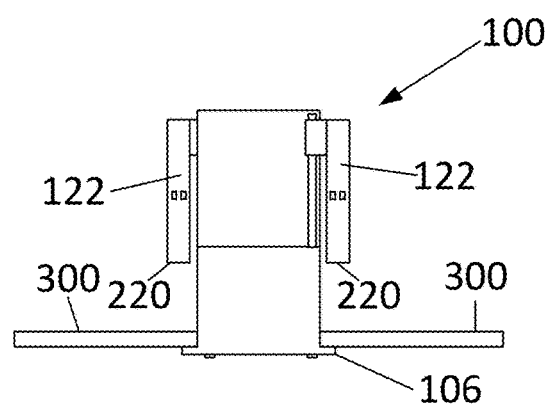
Fig. 3C
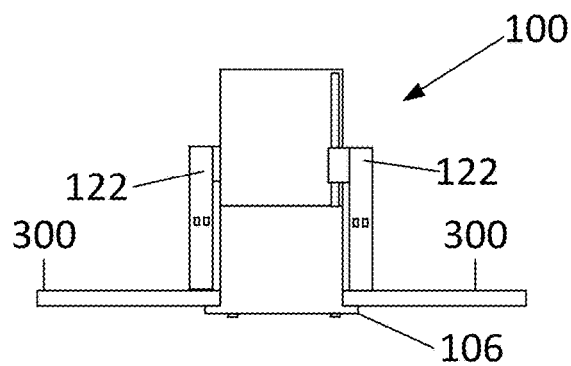
Fig. 3D

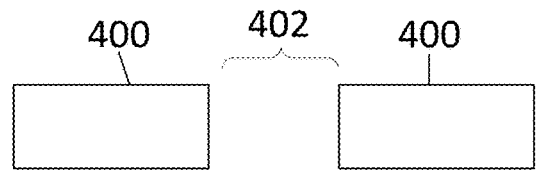
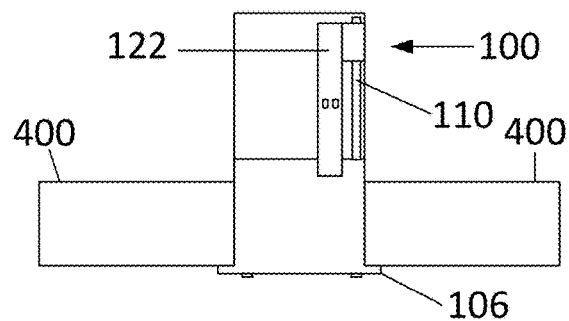
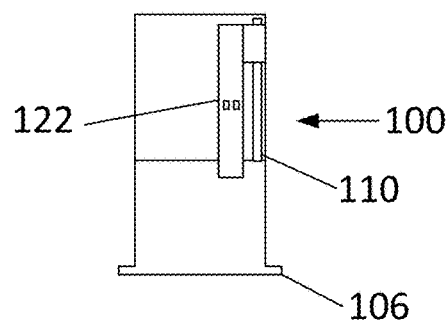
Fig. 4A
Fig. 4B
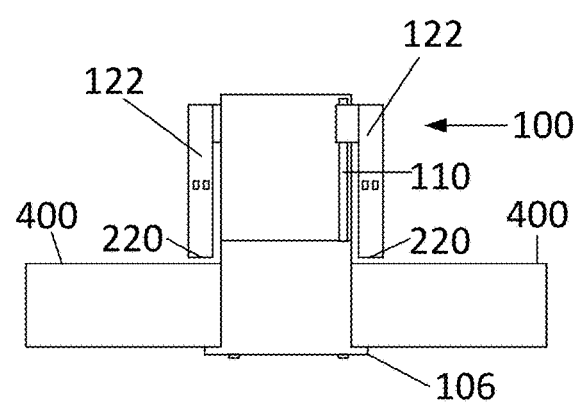
Fig. 4C
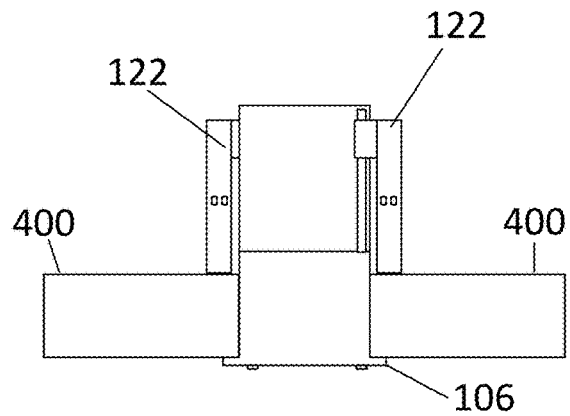
Fig. 4D

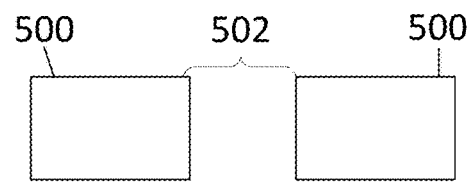
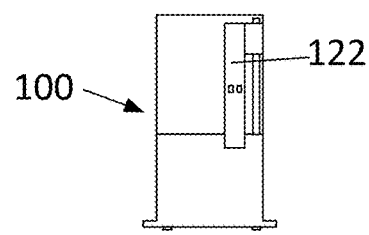
Fig. 5A
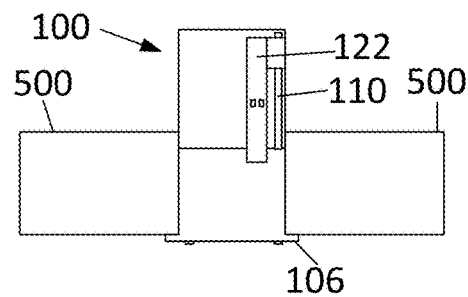
Fig. 5B
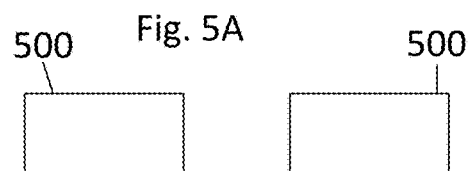
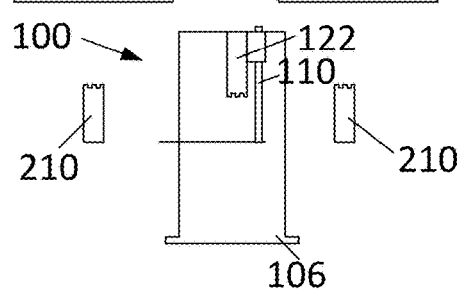
Fig. 5C
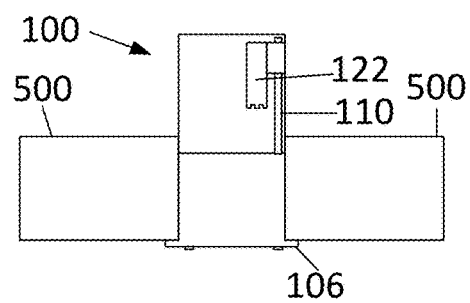
Fig. 5D
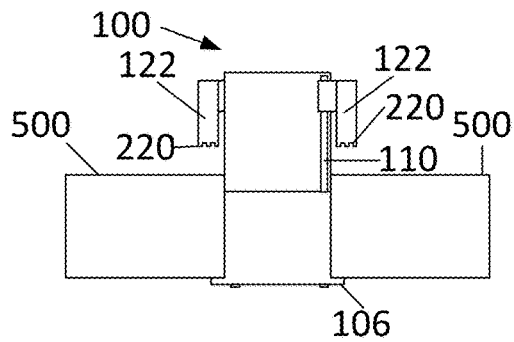
Fig. 5E
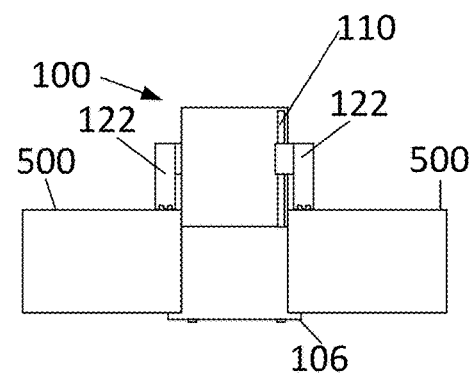
Fig. 5F

SWING ARM FOR RECESSED LIGHTING FIXTURES

CROSS-REFERENCE TO RELATED APPLICATIONS

This application claims the benefit of U.S. Provisional patent application Ser. No. 62/902,620 filed Sep. 19, 2020, the entire contents of which are hereby incorporated by reference herein, for all purposes.

FIELD OF INVENTION

The present technology relates to the field of recessed lighting fixtures, and more particularly to a method and apparatus for installing a recessed lighting fixture from below a finished ceiling where there is no access from above.

BACKGROUND OF THE INVENTION

Recessed lighting fixtures are used in residential and commercial locations and are selected because they are essentially flush with the existing ceiling and therefore occupy little space in a room and are aesthetically pleasing.

Previous recessed lighting fixtures have included cylindrical housings containing lighting elements and include ceiling retaining means, such as swing arms, for retaining the lighting fixtures in a hole cut into the ceiling or other surface of a room, for example, a wall.

The surface may include ceilings and walls including drywall panels, studs, drop ceiling panels, and/or other structural members or panels. Different surfaces through which a lighting fixture may be installed may have different thicknesses. For example, a sheet metal panel may have a thickness of 2 mm to 3 mm, and a ceiling with multiple layers of drywall, soundproofing, or with multiple layers of ceiling due to new construction overlaid on old construction may have a thickness of more than 50 mm. The thickness of a ceiling may not be readily apparent prior to or even after cutting the hole for a recessed lighting fixture. Further, it is desirable to be able to place a recessed lighting fixture at any desired location in a room without accounting for the thickness behind the surface or the location relative to a stud. Existing recessed lighting fixtures either have a fixed thickness, or can adjust to a small range of thicknesses, which limit the surface thicknesses in which they can be installed. Accordingly, there is a need for a recessed lighting fixture that can be secured to a wide range of surface thicknesses.

SUMMARY OF THE INVENTION

A recessed lighting fixture includes an elongated body including a flange and a pair of swing arms. The swing arms are deployable between a stowed configuration adjacent to the elongated body, for example, substantially flush with the elongated body, to a deployed configuration wherein the swing arms extend radially from the elongated body. In the deployed configuration the swing arms are translatable along threaded members extending through the elongated body in order to clamp a ceiling between the swing arms and the flange to secure the recessed lighting fixture into a hole in the ceiling. The swing arms comprise removable portions used to increase the range of thicknesses of ceilings to which the recessed lighting fixture can be clamped.

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

BRIEF DESCRIPTION OF THE DRAWINGS

The disclosure will be readily understood by the following detailed description in conjunction with the accompanying drawings, wherein like reference numerals designate like structural elements, and in which:

FIGS. 2A-2E show views of a swing arm in accordance with embodiments of the invention.

FIGS. 3A-3D show a method of installing a recessed lighting fixture in a first thickness of ceiling in accordance with embodiments of the invention.

FIGS. 4A-4D show a method of installing a recessed lighting fixture in a second thickness of ceiling in accordance with embodiments of the invention.

FIGS. 5A-5F show a method of installing a recessed lighting fixture in a third thickness of ceiling in accordance with embodiments of the invention.

DETAILED DESCRIPTION OF THE INVENTION

Figure 1A:
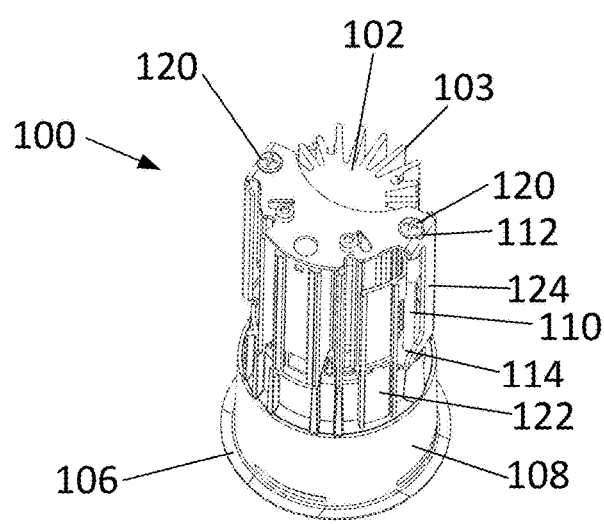
FIGS. 1A, 1B and 1E show views of a recessed lighting fixture in a stowed configuration in accordance with embodiments of the invention.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

FIGS. 1A-1D show an embodiment of a recessed lighting fixture 100. As shown in the top perspective view of FIG. 1A, the recessed lighting fixture 100 comprises an elongated body 102. The elongated body 102 defines a longitudinal axis 104 extending along the long axis of the elongated body 102. The elongated body 102 may be substantially cylindrical in that when viewed from the top the projection of the elongated body 102 is substantially circular, and when viewed from the side the projection is rectangular. As shown, the substantially cylindrical elongated body 102 may include surface features including heat dissipation fins 103 that are within the cylindrical profile of the elongated body 102. In embodiments, the elongated body 102 may be other shapes, including for example, rectangular, square or triangular prisms. In some embodiments, the elongated body may be formed of a single component or may be formed of multiple components coupled together.

The elongated body 102 may house various lighting system components for providing light, including a light source and driver or other electronics for driving and controlling the emission of light from the light source. For example, the elongated body 102 may house a lighting element 107, such as an LED, halogen bulb, or conventional incandescent bulb. The elongated body 102 may house other types of components such as a lightbulb socket, an Edison screw, bi-post, or bayonet style connector, a power supply, a wired or wireless controller, or other components of combinations of components.

The recessed lighting fixture 100 may be installed by placing and securing the recessed lighting fixture 100 within a hole cut through a surface, such as a finished ceiling or wall. The hole is sized and shaped to be larger than the profile of the elongated body 102 perpendicular to the longitudinal axis 104 so that the elongated body 102 can be inserted into the hole.

At an end 108 of the elongated body 102, a flange 106 extends radially from the end 108 of the elongated body 102 so that the flange 106 surrounds the end 108 of the elongated body 102. The flange 106 is sized and shaped to be larger than the hole in the surface to limit the depth that the elongated body 102 can be placed within the hole. When installed the flange 106 is flush against the outside surface of the surface through which the recessed lighting fixture 100 extends. In some embodiments, the flange 106 may be similar in shape to the elongated body 102, for example the flange 106 may be circular. However, the flange 106 may have a different shape than the elongated body 102. In some embodiments, the flange 106 is formed separately or monolithically with the elongated body 102.

The recessed lighting fixture 100 may further include at least one threaded member 110 extending along the elongated body 102. A threaded member 110 may comprise one or more components, for example a screw and a barrel nut threaddedly coupled together. In some embodiments, each threaded member 110 extends parallel to the longitudinal axis 104. The threaded members 110 are rotatably coupled to the elongated body 102, so that the threaded members 110 can rotate relative to the elongated body 102 without translating (i.e., moving longitudinally) relative to the elongated body 102.

The elongated body 102 may include one or more components defining one or more openings for retaining each of the threaded members 110 along the elongated body 102. For example, the elongate body 102 may include an upper sleeve 112 and a lower sleeve 114 through which the threaded member 110 extends so that a central portion of the threaded member 110 is not covered by sleeves of the elongated body 102 but rather is exposed along the elongated body 102. The openings in the elongated body, for example the openings defined by sleeves 112 and 114, guide and retain the threaded member 110 but are not threadably engaged with the threaded member 110. A top end 116 and bottom end of the threaded member 110 may each include a head 120 that is larger than the respective sleeves in order to capture the threaded member 110 in the elongated body 102. In some embodiments, the two heads 120 of a threaded member 110 may be the respective heads of the respective screw and barrel nut comprising the threaded member 110. Either or both of the heads 120 may include a screw drive to allow the threaded member 110 to be rotated by a driver. For example, the screw drive may comprise a slot, a Phillips head, a square drive, a hex socket, a torx socket, or another suitable kind of screw drive. The lower head 120, for example as shown in FIGS. 1E and 1F, may be rotated from outside and below the surface when the elongated body 102 extends through the surface. For example, with the flange 106 flush against the outside surface, an installer from below a ceiling may rotate the head 120 at the bottom end of the threaded member 110. In embodiments, the lower head 120 may on a plane proximate to the flange 106, or the lower head 120 may be recessed within the elongated body 102, for example as shown in FIGS. 1E and 1F.

The recessed lighting fixture 100 may further comprise at least one swing arm 122. One or more swing arms 122 may be threadably attached to each threaded member 110. For example, as shown in FIG. 1C, an embodiment of a recessed lighting fixture 100 includes two threaded members 110 each with one swing arm 122 attached. However, any number of threaded member 110/swing arm 122 pairs may be provided. In some embodiments, each swing arm 122 may be substantially identical to each other.

FIGS. 2A-2E shows views of an embodiment of a swing arm 122. As shown, swing arms 122 may be L-shaped with a first portion 202 of the L including a threaded sleeve 204 which is configured to be threadably coupled to the threaded member 110. Extending from the first portion 202 of the swing 200 arm is a second portion 206. The second portion 206 has a length that extends parallel to the longitudinal axis 104 of the elongated body 102 and that is greater than a length of the first portion 202 to form the L-shape.

As shown in FIG. 2C, from a top perspective the first portion 202 and the second portion 206 are joined to form an angle. The angle 203 on an inward side facing the elongated body 102 in the stowed configuration defines an obtuse angle between 100 and 140 degrees. Further, from the top perspective, the second portion 206 may have a curved profile to substantially match a radius of a cylindrical elongated body 102 so that an outer surface of the swing arm 122 matches an outer radius of the cylindrical elongated body 102.

As shown in FIG. 2D, the second portion 206 of the L-shaped swing arm 122 comprises an upper portion 208 to which the first portion 202 is coupled, and a lower portion 210 distal from the first portion 202. The lower portion 210 is coupled to the upper portion 208 at a breakaway interface 212. The breakaway interface 212 is configured to allow the lower portion 210 to be detached from the upper portion 208 to shorten the swing arm 122. In embodiments, the breakaway interface 212 is configured to allow the lower portion 210 to be bent back and forth relative to the upper portion 208 in order to fatigue the material at the breakaway interface 212 to a point of failure. While second portion 206 of swing arm 122 is illustrated as having two portions (upper portion 208 and lower portion 210), the swing arm 122 may have more than two portions. Each of the adjacent portions may be separated by a breakaway interface such that more than one portion is detachable from the swing arm 122. In some embodiments, the swing arm 122 is formed of plastic or a metal, and may be formed monolithically, for example cast, molded or machined.

In the embodiment shown in FIG. 2D and the cross-section of FIG. 2E, the breakaway interface 212 comprises a reinforcement bar 214 and one or more apertures 216, for example two apertures 216. The reinforcement bar 214 may be adjacent to the apertures 216 on the upper portion 208 and/or lower portion 210. In the illustrated embodiment, the reinforcement bar 214 is adjacent the apertures 216 on the upper portion 208, above the apertures 216. The reinforcement bar 214 may be thicker than the adjacent upper portion 208 and lower portion 210. By virtue of the apertures 216, the lower portion 210 is connected to the upper portion 208 by three narrow connection sections 218. The reinforcement bar 214 and apertures 216 cause bending stress to be concentrated on the three connection sections 218, which define sides of the apertures 216, so that when a bending force is applied to the swing arm 122 bending occurs across the connection sections 218. The force necessary to cause bending may be configured to allow tool-less removal of the lower portion 210 from the upper portion 208. For example, an installer may grasp the upper portion 208 with one hand and the lower portion 210 with another hand in order to bend the breakaway interface 212 back and forth. Alternately, the force necessary to detach the lower portion 210 may be configured to allow removal of the lower portion 210 from the upper portion 208 using the torque provided by a set of pliers gripping the lower portion 210 to bend the breakaway interface 212 to and fro.

In embodiments, a breakaway interface 212 may additionally or alternatively comprise other features to concentrate bending stress at the breakaway interface. For example, the breakaway interface 212 may comprise thinner sections of material extending intermittently or continuously across the width of the breakaway interface 212.

Prior to removal of the lower portion 210 from the upper portion 208, the swing arm 122 is in an elongated configuration, wherein an abutment end 220 of the swing arm 122 is defined as the end of the lower portion 210 opposite the end of the lower portion 210 at the breakaway interface 212. After removal of the lower portion 210, the swing arm 122 is in a shortened configuration, wherein the abutment end 220 is defined as the end of the lower portion 210 where the breakaway interface 212 between the upper portion 208 and lower portion 210 previously existed. In the shortened confirmation, the lower portion 210 is not attached to the swing arm 122 and may be disposed of.

Removing the lower portion 210 by way of the breakaway interface 212 allows a user to select the position of the abutment end 220 relative the first portion 202, and thus select the effective length of the swing arm 122. This is beneficial for accommodating different thicknesses of ceilings as shown in FIGS. 3A-3D, 4A-4D, and 5A-5E.

Figure 1B:
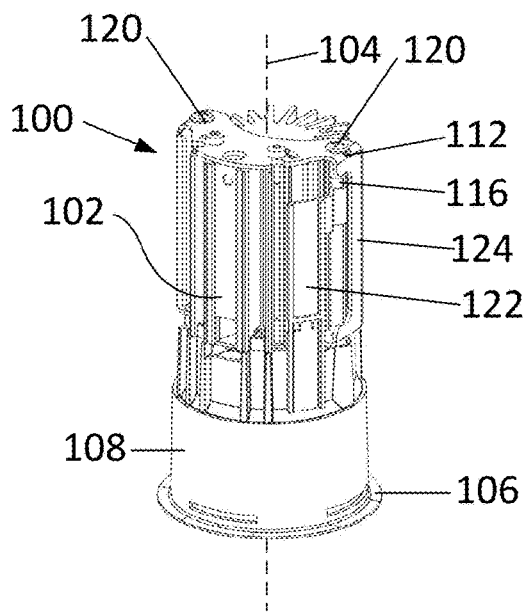
Figure 1C:
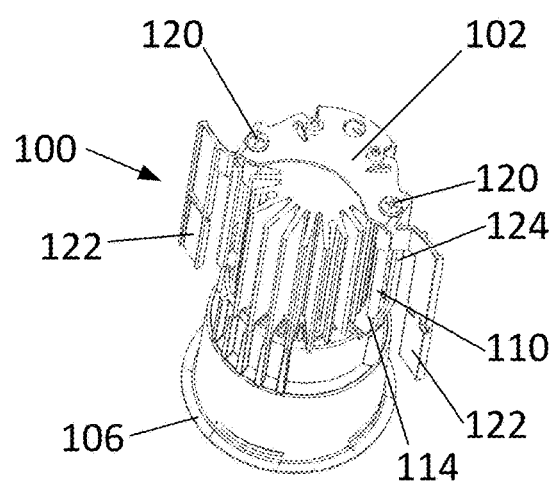
FIGS. 1C, 1D and 1F show views of a recessed lighting fixture in a deployed configuration in accordance with embodiments of the invention.
Figure 1D:
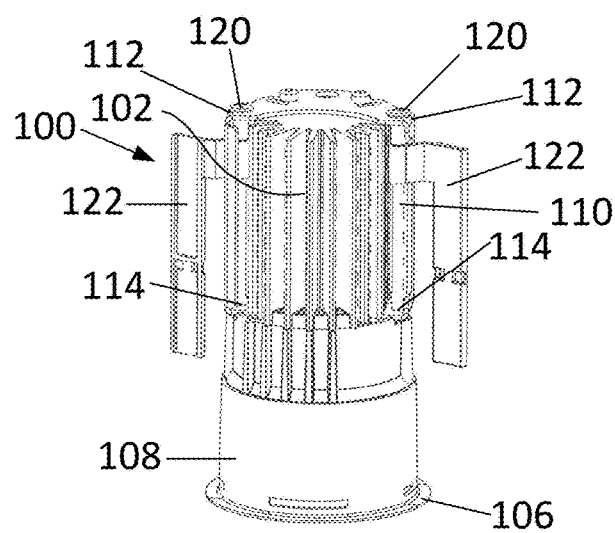
Figure 1E:
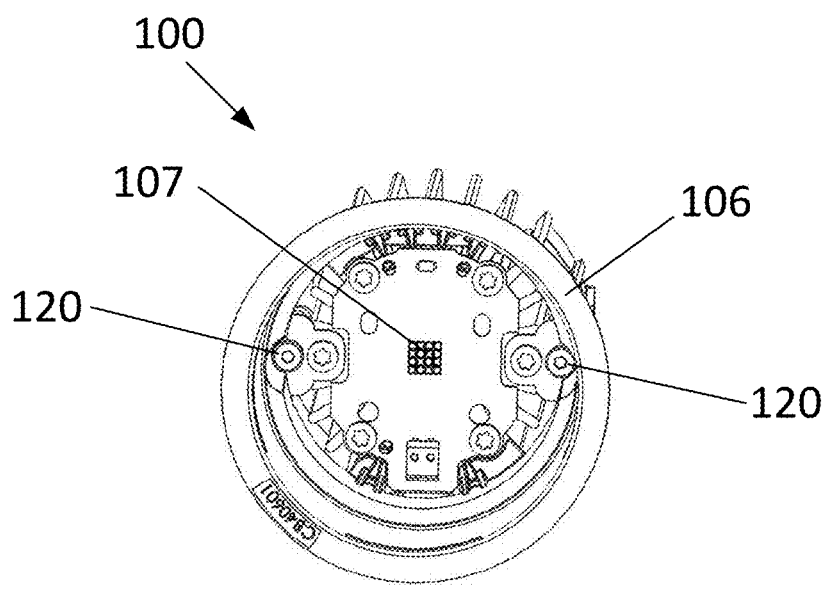
Figure 1F:
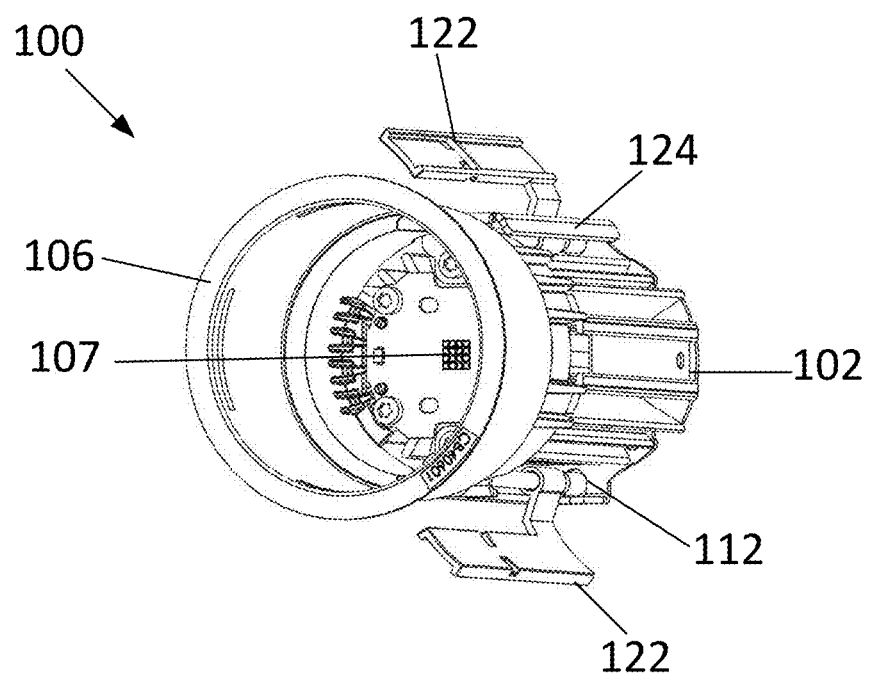

The swing arms 122 are each rotatable between a stowed configuration, for example as shown in FIGS. 1A and 1B, and a deployed configuration, for example as shown in FIGS. 1C and 1D, by way of at least one of the threadable connection of the swing arms 122 to the threaded members 110 and the free rotation of the threaded member 110 relative to the elongated body 102. As shown in the top perspective view of FIG. 1A and side view of FIG. 1B, in the stowed configuration both the first portion 202 and the second portion 206 of the swing arms 122 are adjacent to the elongated body 102, and the swing arms 122 are substantially flush with the elongated body 102. In some embodiments, the elongated body 102 comprises recesses on the side surfaces for the swing arms 122 to be positioned within when in the stowed position so that the swing arms 122 do not extend outside of the profile of the elongated body 102 so that the swing arms 122 do prevent the elongated body 102 from being inserted into a hole with a size and shape corresponding to the elongated body 102. The recesses may also limit vertical translation of the swing arm 122 relative to the elongated body 102 in the stowed configuration.

The swing arms 122 may be transitioned to the deployed position from the stowed configuration by rotating the threaded member 110 in a first direction to initially cause the second portion 206 to move away from the elongated body 102. During the initial portion of the rotation the friction between the threaded coupling of the threaded member 110 and the swing arm 122 causes the threaded member 110 and swing arm 122 to rotate together. The swing arm 122 and threaded member 110 rotate together until the swing arm 122 contacts a stop bar 124 extending between the upper sleeve 112 and the lower sleeve 114. When the swing arm 122 contacts the stop bar 124 the swing arm 122 extends radially from the elongated body 102 in the deployed position, as shown in the top perspective view of FIG. 1C. As shown in the side view of FIG. 1D, the two swing arms 122 may extend radially in opposite directions.

Due to the stop bar 124 preventing further rotation of the swing arm 122, subsequent rotation of the threaded member 110 in the first direction causes the swing arm 122 to translate down the threaded member 110 toward the lower sleeve 114. The first portion 202 of the swing arm 122 may initially be positioned toward the top of the threaded member 110 at a first position proximate to the upper sleeve 112, and due to the rotation of the threaded member 110 the swing arm 122 may be translated down the threaded member 110 toward the lower sleeve 114 to a second position proximate to the lower sleeve 114, so that the first portion 202 is closer to the flange 106. Translation of the swing arm 122 along threaded member 110 may be limited due to contact of the first portion 202 of the swing arm 122 with the upper sleeve 112 and the lower sleeve 114.

As will be discussed in greater detail below, the swing arm 122 is translated from the first position to the second position in order to clamp the surface through which the elongated body 102 extends between the flange 106 and the abutment end 220 of the swing arm 122, which is defined depending on the swing arm 122 being in the shortened configuration or the elongated configuration (depending on the thickness of the surface).

To install a recessed lighting fixture 100 as disclosed above, a hole is first cut in the surface, for example a finished ceiling. The hole is cut to have a diameter greater than the diameter of the elongated body 102, but smaller than a diameter of the flange 106, so that the elongated body 102 may be slid into the hole with the flange 106 preventing the entire recessed lighting fixture 100 from passing completely into the ceiling.

FIGS. 3A-3D show an example of installing a recessed lighting fixture 100 into a relatively thin surface 300, such as a sheet metal ceiling. Given the thinness of the surface 300, the lower portion 210 is not detached from the swing arm 122 prior to installation. Prior to inserting the lighting fixture 100, wiring may be connected to the lighting fixture 100. As shown, in FIG. 3A the lighting fixture 100 may be inserted into a hole 302 in a ceiling with the swing arms 122 in the stowed configuration. As shown, the hole 302 is larger than the cross-dimension of the elongated body 102 and smaller than the cross-dimension of the flange 106. The lighting fixture 100 is inserted into the hole 302 until the flange 106 is flush with the ceiling 300, as shown in FIG. 3B. In FIG. 3B, the swing arms 122 remain in the stowed configuration with the first portion 202 at the first position at an upper location on the fixture 100. From beneath the ceiling 300, a user may use a driver, for example a screwdriver, to rotate each threaded member 110 to cause the swing arms 122 to rotate to the deployed configuration, as shown in FIG. 3C. As shown, the thickness of the surface 300 in this example does not prevent rotation of the swing arms 122 to the deployed configuration. Once in the deployed configuration, the threaded members 110 are further rotated to causes the swing arms 122 to lower toward the second position at a lower location on the fixture 100 proximate the surface 300, until the abutment ends 220, defined in this example by the lower portion 210 of the second portion 206 of the swing arm 122, contact an interior surface of the ceiling 300, as shown in FIG. 3D. The swing arms 122 may be individually and sequentially lowered until all swing arms 122 contact the interior surface of the ceiling 300 in order to clamp the recessed lighting fixture 100 in place.

FIGS. 4A-4D show an example of installing a recessed lighting fixture 100 to a relatively thicker surface 400 than the ceiling of FIGS. 3A-3D, such as a single layer drywall ceiling. The installer may similarly install the lighting fixture 100 as noted above regarding FIGS. 3A-3D. For example, as shown in FIG. 4A the lighting fixture 100 may be inserted into a hole 402 in the surface 400. The lighting fixture 100 is inserted into the hole 402 until the flange 106 is flush with the exterior surface of the surface 400, as shown in FIG. 4B. In FIG. 4B, the swing arms 122 are in the stowed configuration with the first portion 202 at the upper location on the fixture 100. From beneath the surface 400, a user may use a driver, for example a screwdriver, to rotate the threaded member 110 to cause the swing arms 122 to rotate to the deployed configuration, as shown in FIG. 4C. As shown, the thickness of the surface 400 in this example, while thicker than the surface 300 of FIG. 3A, also does not prevent rotation of the swing arms 122 to the deployed configuration. For ceilings with a greater thickness than shown in FIGS. 4A-4D, rotation to the deployed configuration would be prevented by the side surfaces of the hole holding the swing arms 122 against the elongated body 102. Similar to above, once the swing arms 122 are in the deployed configuration the threaded members 110 are further rotated to cause the swing arms 122 to lower toward the lower location on the fixture proximate the surface 300, until the abutment ends 220, defined in this example by the lower portion 210 of the second portion 206 of the swing arm 122, contact the interior surface of the ceiling 400 as shown in FIG. 4D, which in this example only requires a small translation of the swing arms 122 along threaded member 110.

FIGS. 5A-5E show an example of installing a recessed lighting fixture 100 to an even thicker surface 500 than the surfaces 300, 400 of FIGS. 3A-3D and FIGS. 4A-4D, such as a double layer drywall ceiling. As shown in FIG. 5A, the lighting fixture 100 may be inserted into a hole 502 in a surface 500. The lighting fixture 100 is inserted into the hole 502 until the flange 106 is flush with the exterior surface of the ceiling 500, as shown in FIG. 5B. In FIG. 5B, the swing arms 122 are in the stowed configuration with the first portion 202 at the upper location on the fixture 100. From beneath the ceiling a user may use a driver, for example a screwdriver, to rotate the threaded member 110 to attempt to cause the swing arms 122 to rotate to the deployed configuration. As shown in FIG. 5B, the thickness of the surface 500 prevents rotation of the swing arms 122 from the elongated configuration to the deployed configuration due to the side surfaces of the hole 502 restricting rotation of the second portion 206 of the swing arm 122. The lighting fixture 100 may then be removed from the hole 502 and the lower portions 210 of the swing arms 122 may be detached to place the swing arms 122 in the shortened configuration, as shown in FIG. 5C. The lighting fixture 100 may be reinserted into the surface 500 (as shown in FIG. 5D) and threaded members 110 may again be rotated, which causes the swing arms 122 to transition to the deployed configuration as shown in FIG. 5E since the side surfaces of the hole 502 no longer prevent motion of the second portion 206 of the swing arm 122. Similar to above, once the swing arms 122 are in the deployed configuration the threaded members 110 are further rotated to cause the swing arms 122 to lower toward the second position, until the abutment ends 220 (defined in this example by the upper portion 208 of the second portion 206 of the swing arm 122) contact the interior surface of the surface 500, as shown in FIG. 5F. One of skill in the art will understand that the fixture 100 may be removed in a similar manner as it was installed. More specifically, the swing arms 122 may be transitioned from the deployed configuration back to the stowed configuration by rotating the threaded member 110 in a second direction, opposite the first direction used to transition the swings arms 122 from the stowed configuration to the deployed configuration. Rotating the threaded member 110 in the second direction causes the second portion 206 to rotate toward the elongated body 106 so that the swing arm 122 no longer extends radially from the elongated body, and causes the first portion 202 to translate up the threaded member 110 from the second position at the lower location on the fixture 100 to the first position at the upper location on the fixture with the swing arm 122 in the stowed configuration. With the swing arms 122 back in the stowed configuration, the light fixture 100 may be pulled out of the hole in the ceiling without the swings arms 122 preventing the withdrawal.

In some embodiments, the swing arms 122 are individually rotated to determine if the shortened configuration is needed to accommodate the surface thickness. Surface thicknesses may not be uniform around the entire perimeter of the hole and one swing arm 122 may be prevented from being rotated into the deployed configuration while another swing arm 122 is not prevented from rotating. In such case, only a subset of the swing arms 122 may be transitioned to the shortened configuration, and the remaining swing arms are maintained in the elongated configuration. The lighting fixture 100 may then be reinserted into the hole in the same orientation in order to be secured to the ceiling with different length swing arms 122. When the thickness of the ceiling is known, it is not necessary to insert the lighting fixture 100 into the ceiling, try to deploy the swing arms 122, and remove the lighting fixture 100 from the ceiling before removing the lower portions of the swing arms 122. The lower portions of the swing arms 122 may be removed before installing the light fixture 100, when it has been previously determined that their removal will be necessary.

For example, the thickness of the ceiling may be known beforehand, or may be measured once the hole is cut.

Figure 6:
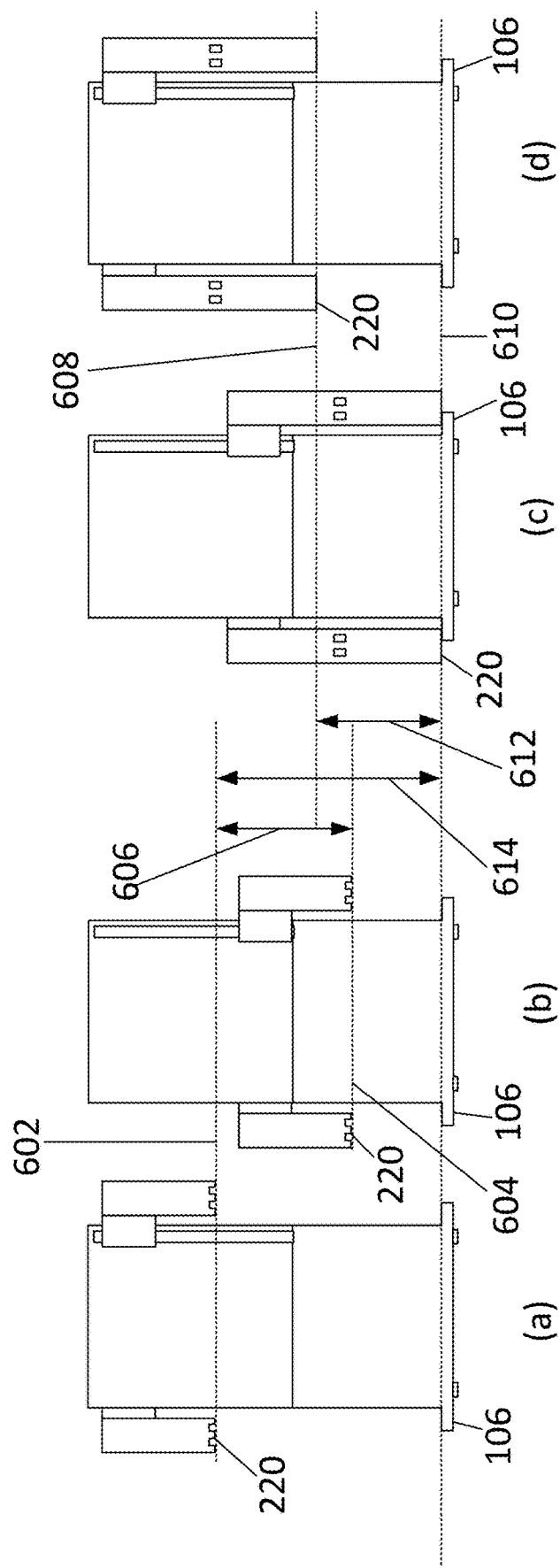
FIG. 6 shows the continuous clamping range of a recessed lighting fixture in accordance with embodiments of the invention.

FIG. 6 show the clamping ranges of the elongated configuration and the shortened configuration, which together define the clamping range of the lighting fixture 100.

Section (a) shows the swing arm 122 in the shortened configuration at the first position (upper location on the fixture) with a first horizontal line 602 indicating the vertical distance between the flange 106 and the abutment end 220 in the shortened configuration. Section (b) shows the swing arm 122 in the shortened configuration at the second position (lower location on the fixture) with a second horizontal line 604 indicating the vertical distance between the flange 106 and the abutment end 220 in this configuration. The distance between the first horizontal line 602 and the second horizontal line 604 define the shortened configuration clamping range 606.

Section (d) shows the swing arm 122 in the elongated configuration at the first position (upper location on the fixture) with a third horizontal line 608 indicating the vertical distance between the flange 106 and the abutment end 220 in the elongated configuration. Section (c) shows the swing arm 122 in the elongated configuration at the second position (lower location on the fixture) with the abutment end 220 in the elongated configuration adjacent the flange 106 at fourth horizontal line 610. The distance between the third horizontal 608 line and the fourth horizontal line 610 define the elongated configuration clamping range 612. In some embodiments, the abutment end 220 in the elongated configuration with the swing arm 122 at the second position may be spaced from the flange 106 in order to define a minimum clamping thickness, for example 5 mm.

In some embodiments and as shown, the distance of the breakaway interface 212 is selected so that the abutment end 220 at the second position of the shortened configuration is closer to the flange 106 than the distance of the abutment end at the first position of the elongated configuration, so that the shortened configuration clamping range 606 and the elongated configuration clamping range 612 overlap to define a continuous clamping range 614 of the lighting fixture 100. With a continuous clamping range, the lighting fixture 100 can be clamped to a surface with a thickness between the smallest thickness in the elongated configuration clamping range and the largest thickness in the shortened configuration clamping range. In embodiments, the continuous clamping range may extend between 5 mm and 75 mm.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

What is claimed is:

1. A recessed lighting fixture comprising:
    an elongated body defining a longitudinal axis and configured to house a light source;
    a flange provided at an end of the elongated body;
    a threaded member extending at least partially along the elongated body and rotatably coupled to the elongated body; and
    a swing arm comprising a first portion threadably coupled to the threaded member, and a second portion extending from the first portion, wherein an end of the second portion most distal from the first portion defines an abutment end,
    wherein the swing arm is configured to clamp a surface between the abutment end and the flange,
    wherein the swing arm is configured to be transitioned from an elongated configuration to a shortened configuration,
    wherein in the elongated configuration the second portion of the swing arm comprises a lower portion, an upper portion, and a breakaway interface between the upper portion and the lower portion,
    wherein in the shortened configuration the second portion of the swing arm comprises the upper portion and does not comprise the lower portion,
    wherein the threaded member is configured so that rotating the threaded member with the swing arm in a deployed configuration, with the second portion extending radially from the elongated body, causes the swing arm to translate relative to the elongated body from a first position wherein the abutment end is a first distance from the flange to a second position wherein the abutment end is a second distance from the flange that is less than the first distance, and
    wherein the breakaway interface comprises one or more apertures between the lower portion and the upper portion, and a reinforcement bar between the one or more apertures and the upper portion of the lower portion and extending across a width of the second portion,
    wherein the reinforcement bar is thicker than portions of the upper portion and lower portion adjacent to the breakaway interface, and
    wherein the reinforcement bar is configured to cause bending stress to be concentrated on connection sections between the upper portion and the lower portion and defined by sides of the one or more apertures so that when a bending force is applied to the swing arm bending occurs adjacent the reinforcement bar across the connection sections in order to allow the lower portion of the second portion of the swing arm to be detached from the upper portion in order to transition the swing arm from the elongated configuration to the shortened configuration.

2. The recessed lighting fixture of claim 1, wherein transitioning the swing arm from the elongated configuration to the shortened configuration allows a selection of a first end of the lower portion defining the abutment end or a second end of the upper portion defining the abutment end,
    wherein the recessed lighting fixture comprises a clamping range defined by a maximum distance defined as a third distance between the flange and the abutment end of the swing arm in the shortened configuration with the swing arm at the first position and a minimum distance defined as a fourth distance between the flange and the abutment end of the swing arm in the elongated configuration with the swing arm at the second position.

3. The recessed lighting fixture of claim 1, wherein the swing arm is configured to be positioned in a stowed configuration with the second portion adjacent to the elongated body, and wherein the swing arm is configured so that rotating the threaded member with the swing arm in the stowed configuration causes the swing arm to rotate from the stowed configuration to the deployed configuration.

4. A method of installing the recessed lighting fixture of claim 3, comprising:

inserting the elongated body of the recessed lighting fixture into a hole in a ceiling so that the flange is flush with a surface of the ceiling; and rotating the threaded member to cause the swing arm (1) to transition from the stowed configuration to the deployed configuration and (2) to translate relative to the elongated body from the first position to the second position to clamp the ceiling between the flange and the abutment end of the swing arm.

5. The method of claim 4, wherein after inserting the elongated body into the hole in the ceiling and prior to rotating the threaded member, the method further comprises:

attempting to rotate the threaded member in order to rotate the swing arm from the stowed configuration to the deployed configuration and determining that rotation of the swing arm is prevented due to a thickness of the ceiling;

removing the elongated body of the recessed lighting fixture from the hole in the ceiling with the swing arm in the stowed configuration, and transitioning the swing arm from the elongated configuration to the shortened configuration; and reinserting the elongated body of the recessed lighting fixture back into the hole in the ceiling with the swing arm in the shortened configuration and in the stowed configuration.

6. The method of claim 5, wherein transitioning the swing arm from the elongated configuration to the shortened configuration comprises bending the lower portion relative to the upper portion to separate the lower portion from the upper portion.

7. The method of claim 5, wherein the recessed lighting fixture further comprises a second swing arm substantially identical to the swing arm, and wherein the method further comprises:

transitioning the second swing arm from the elongated configuration to the shortened configuration when the elongated body is removed from the hole; and rotating a second threaded member to cause the second swing arm to transition from the stowed configuration to the deployed configuration, and further rotating the second threaded member to cause the second swing arm to translate relative to the elongated body from the first position to the second position to clamp the ceiling between the flange and the abutment end of the second swing arm.

8. The method of claim 5, wherein the recessed lighting fixture further comprises a second swing arm substantially identical to the swing arm, and wherein the method further comprises:

maintaining the second swing arm in the elongated configuration when the elongated body is removed from the hole so that the swing arm and second swing arm are different lengths; and rotating a second threaded member to cause the second swing arm to transition from the stowed configuration to the deployed configuration, and further rotating the second threaded member to cause the second swing arm to translate relative to the elongated body from the first position to the second position to clamp the ceiling between the flange and the abutment end of the second swing arm.

9. The recessed lighting fixture of claim 1, wherein the swing arm is L-shaped with the second portion extending from the first portion in a direction parallel to the longitudinal axis of the elongate body.

10. The recessed lighting fixture of claim 1, wherein the threaded member extends along the elongated body parallel to the longitudinal axis of the elongated body.

11. The recess lighting fixture of claim 1, wherein the elongated body is substantially cylindrical, and wherein the flange is circular.

12. The recessed lighting fixture of claim 11, wherein the flange surrounds a bottom portion of the elongated body.

13. The recessed lighting fixture of claim 1, further comprising a second swing arm substantially identical to the swing arm.

14. A method of installing a recessed lighting fixture in a ceiling, the method comprising:

providing a light fixture comprising:

an elongated body defining a longitudinal axis and configured to house a light source;

a flange provided at an end of the elongated body;

a threaded member extending at least partially along the elongated body and rotatably coupled to the elongated body; and an swing arm comprising a first portion threadably coupled to the threaded member, and a second portion extending from the first portion in a direction parallel to the longitudinal axis, wherein an end of the second portion most distal from the first portion defines an abutment end, and wherein the second portion of the swing arm comprises a lower portion, an upper portion, and a breakaway interface between the first portion and the second portion, wherein the breakaway interface comprises one or more apertures between the lower portion and the upper portion, and a reinforcement bar between the one or more apertures and the upper portion of the lower portion and extending across a width of the second portion, wherein the reinforcement bar is thicker than portions of the upper portion and lower portion adjacent to the breakaway interface, and wherein the reinforcement bar is configured to cause bending stress to be concentrated on connection sections between the upper portion and the lower portion and defined by sides of the one or more apertures so that when a bending force is applied to the swing arm bending occurs adjacent the reinforcement bar across the connection sections in order to allow the lower portion of the second portion of the swing arm to be detached from the upper portion;

inserting the elongated body of the recessed lighting fixture into a hole in the ceiling with the swing arm in a stowed configuration wherein the second portion is substantially flush with the elongated body;

rotating the threaded member to cause the swing arm to rotate from the stowed configuration to a deployed configuration wherein the second portion extends radially from the elongated body, and to cause the swing arm in the deployed configuration to translate relative to the elongated body from a first position wherein the abutment end is a first distance from the flange to a second position wherein the abutment end is a second distance from the flange that is less than the first distance to clamp the ceiling between the flange and the abutment end of the swing arm.

15. The method of claim 14, wherein prior to inserting the elongated body of the recessed lighting fixture into the hole in the ceiling, the method further comprises:

determining that installation of the light fixture in the ceiling is prevented by a thickness of the ceiling due to the swing arm being in an elongated configuration wherein the swing arm comprises the lower portion, the upper portion and the breakaway interface; and transitioning the swing arm to a shortened configuration by separating the lower portion from the upper portion at the breakaway interface so that an end of the upper portion at the breakaway interface defines the abutment end.

16. The method of claim 15, wherein determining that installation of the light fixture in the ceiling is prevented by the thickness of the ceiling when the swing arm is in the elongated configuration comprises:

inserting the elongated body of the recessed lighting fixture into the hole in the ceiling with the swing arm in the elongated configuration so that the flange is flush with the ceiling;

attempting to rotate the threaded member to attempt to cause the swing arm to transition to the deployed configuration; and determining that rotation of the swing arm to the deployed configuration is prevented due to a thickness of the ceiling.

17. The method of claim 15, wherein determining that installation of the light fixture in the ceiling is prevented by the thickness of the ceiling when the swing arm is in the elongated configuration comprises:

determining that a predetermined thickness of the ceiling is greater than a clamping range of the swing arm in the elongated configuration.

18. The method of claim 15, wherein transitioning the swing arm to the shortened configuration comprises bending the lower portion relative to the upper portion without a tool in order to separate the lower portion from the upper portion.

* * * * *